Dec. 26, 1961    A. J. ALBRECHT ET AL    3,014,721
PIN DISTRIBUTING MECHANISM
Filed March 4, 1960    7 Sheets-Sheet 1
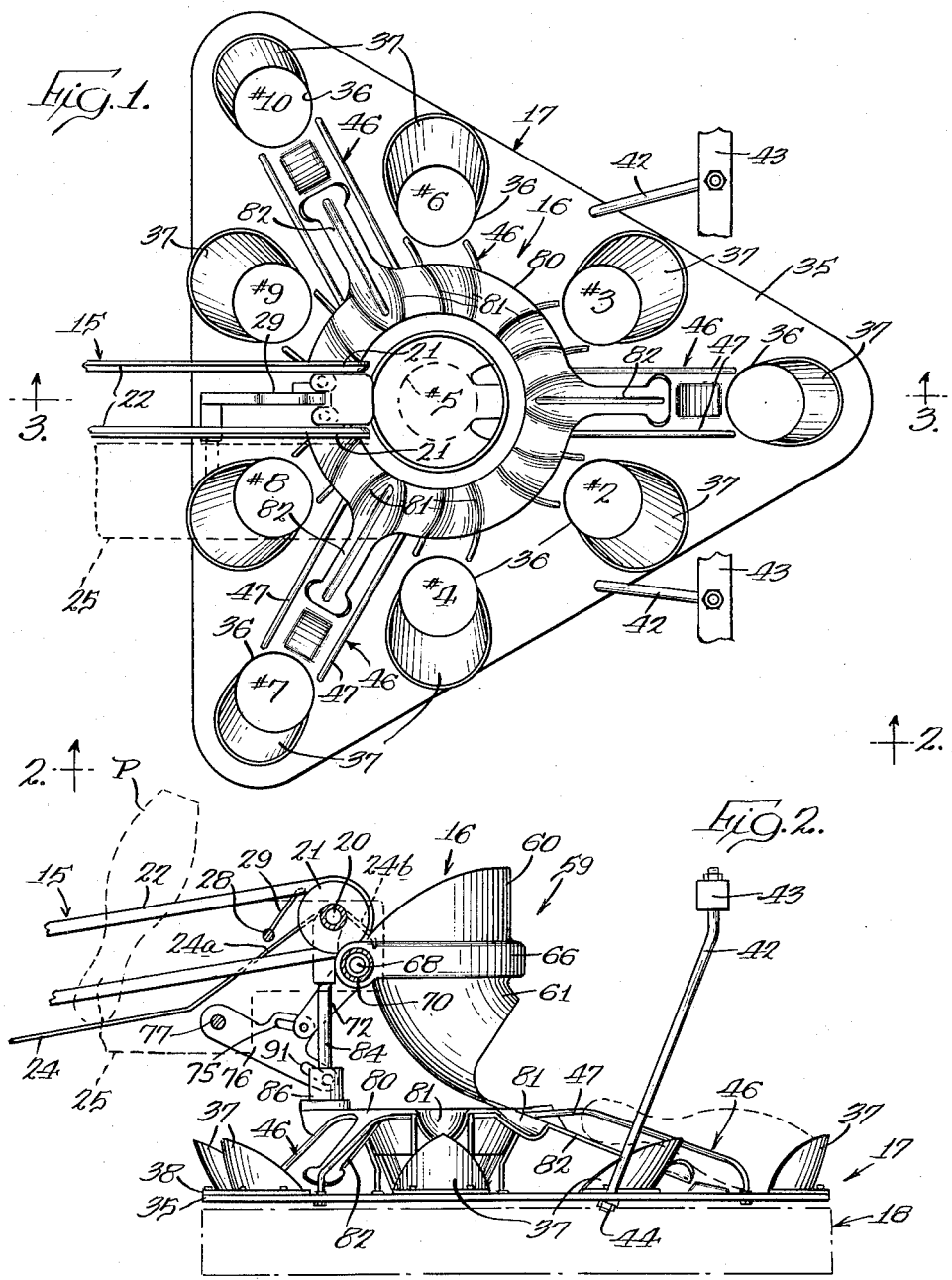
INVENTORS:
Alexander J. Albrecht
James B. Wyatt
By Hofgren, Brady,
Wegner, Allen & Stellman
Attys

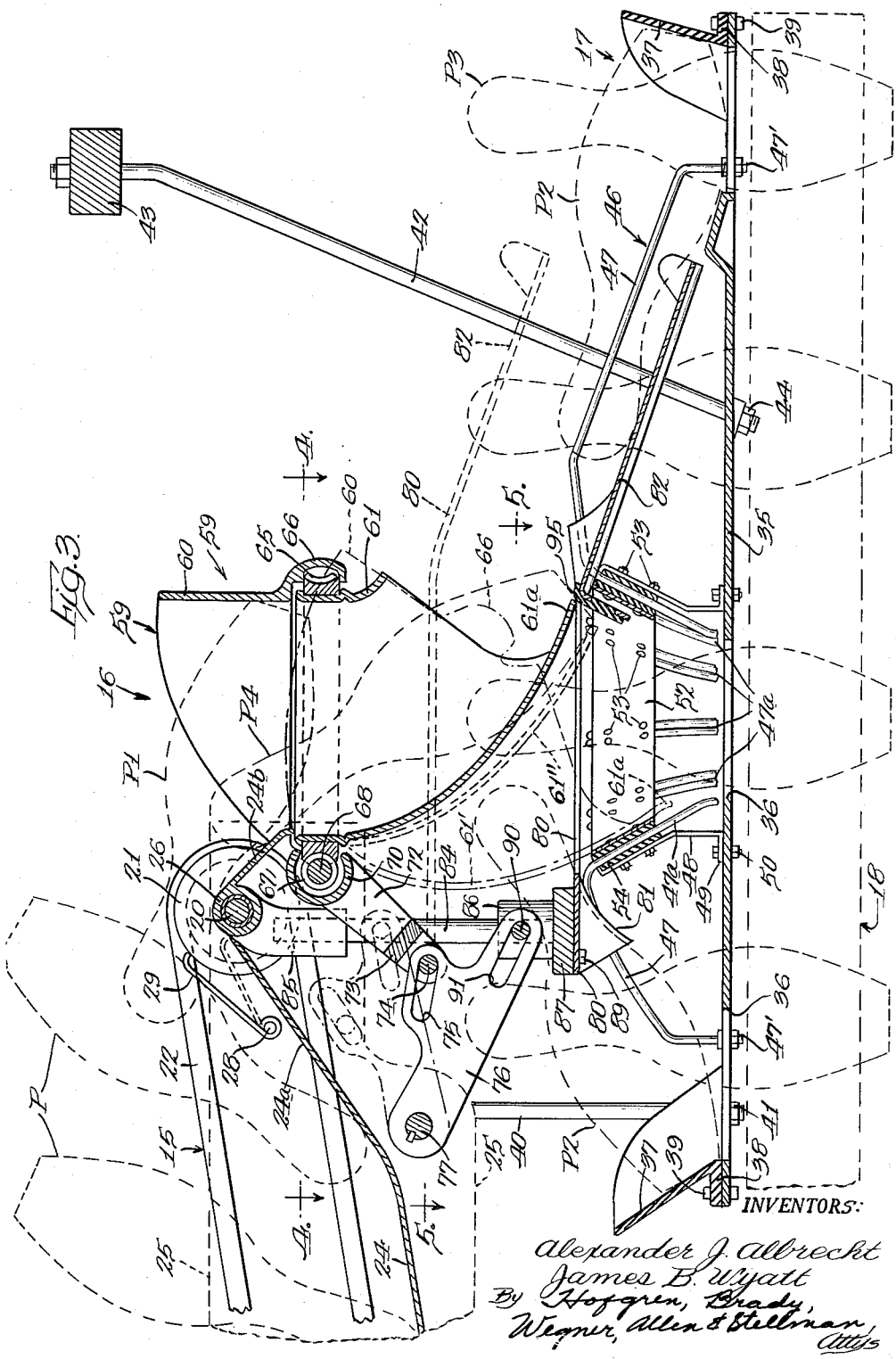

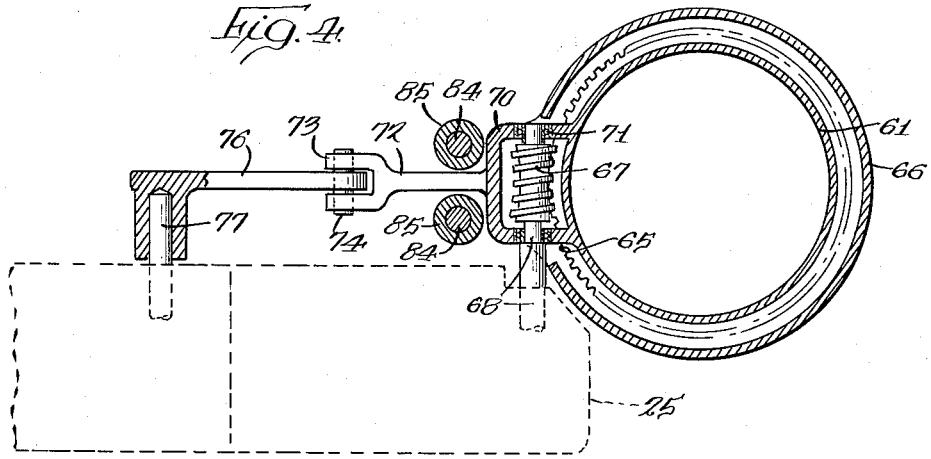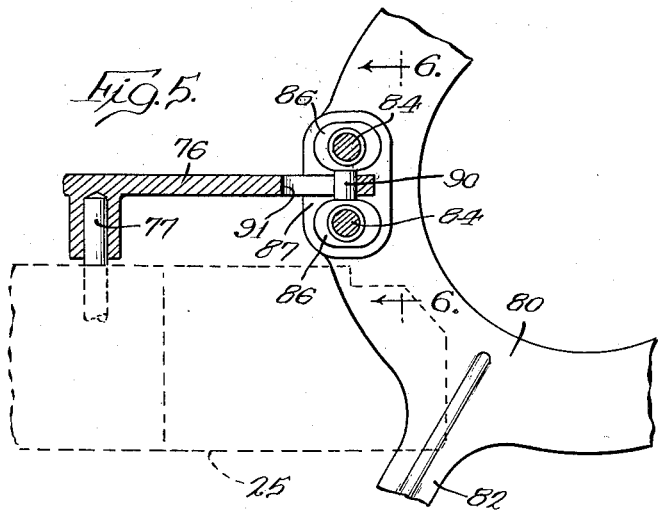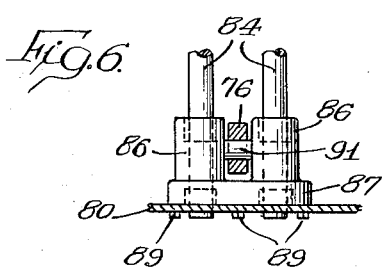

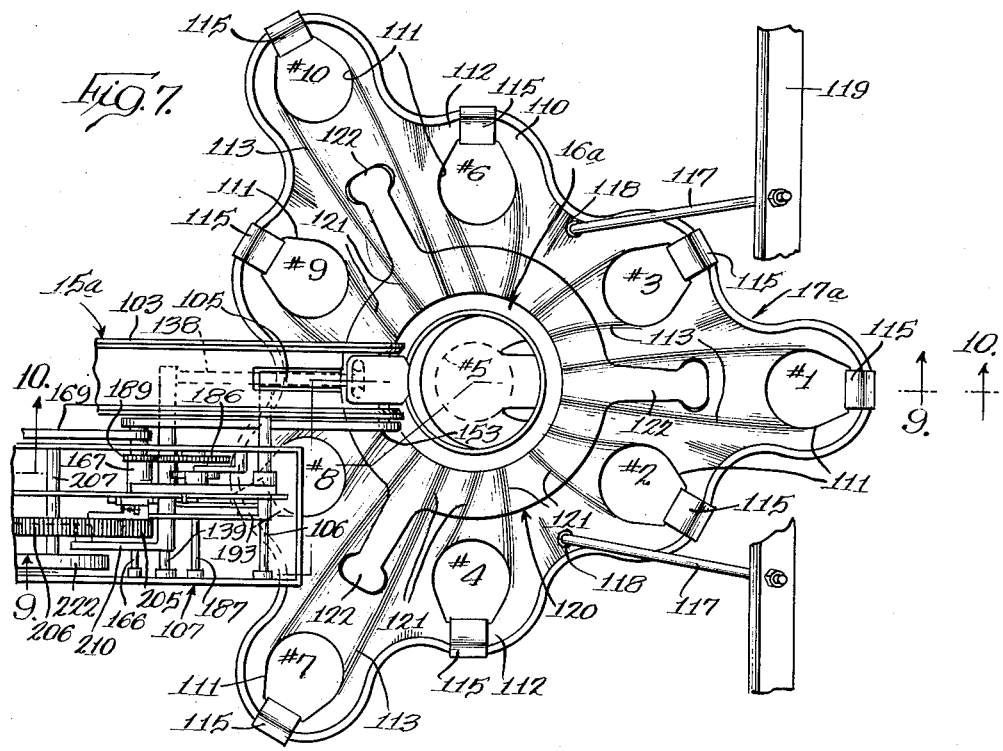

Dec. 26, 1961  A. J. ALBRECHT ET AL  3,014,721
PIN DISTRIBUTING MECHANISM
Filed March 4, 1960  7 Sheets-Sheet 5
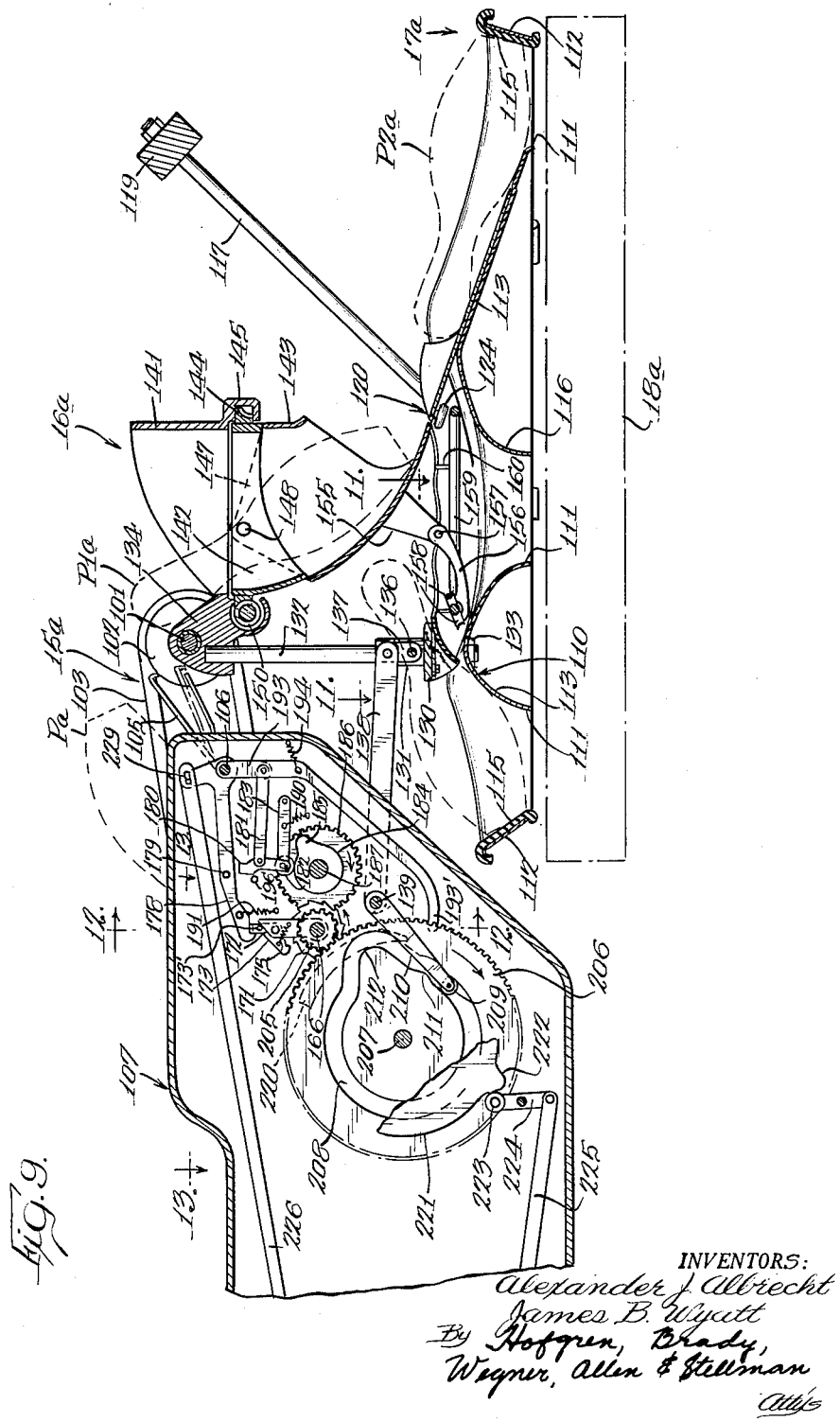
INVENTORS:
Alexander J. Albrecht
James B. Wyatt
By Hofgren, Brady,
Wegner, Allen & Stellman
Attys

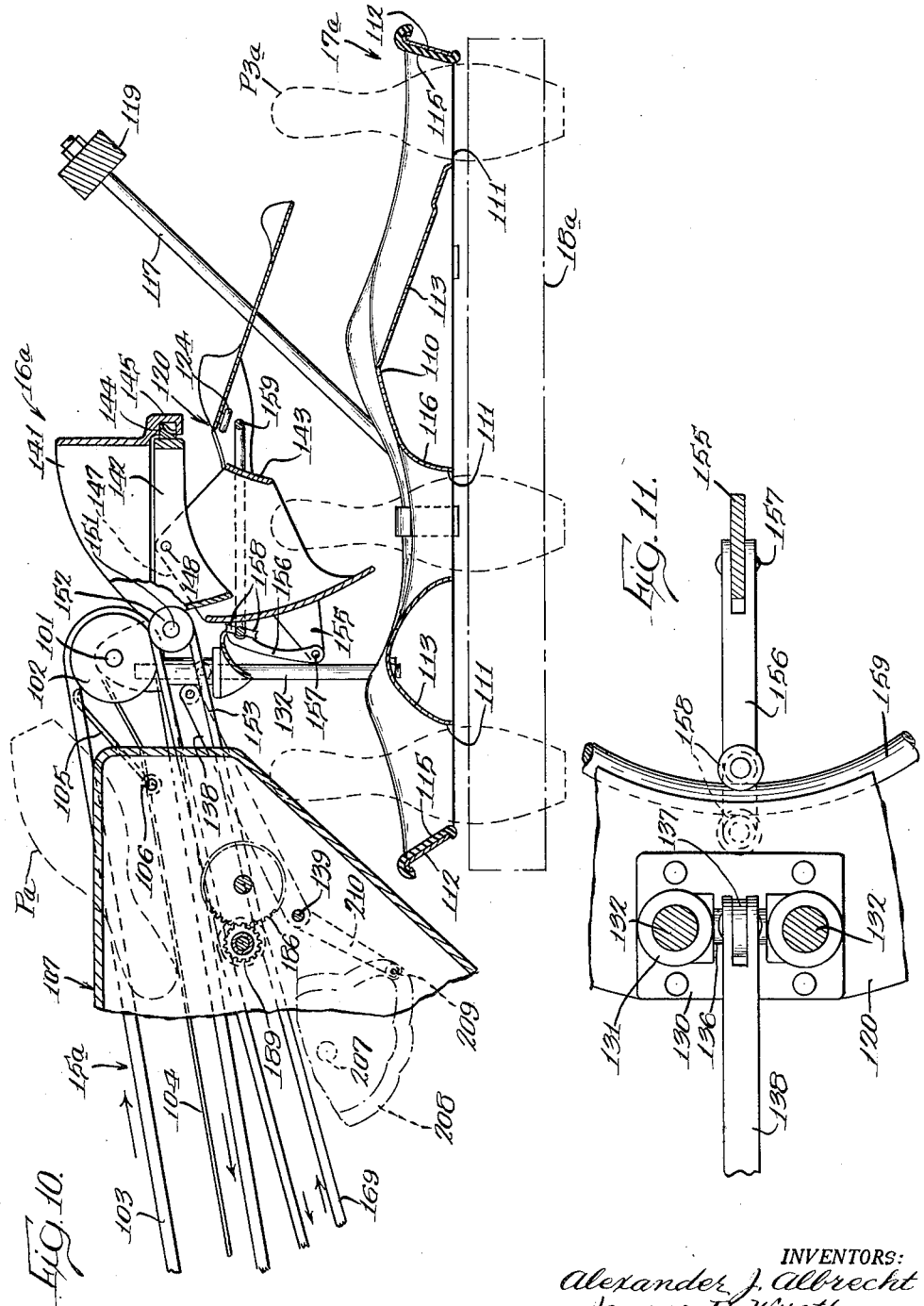

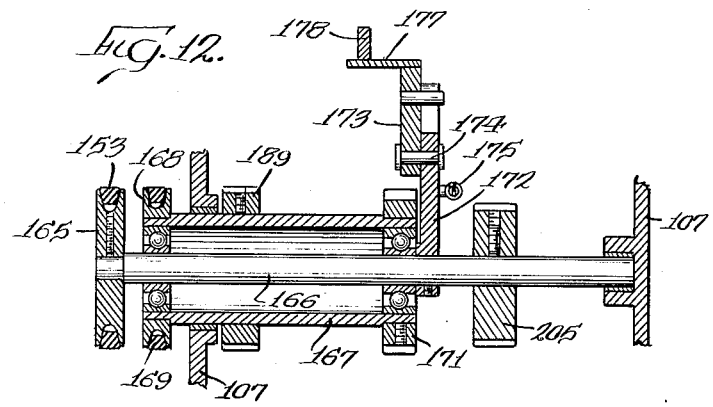
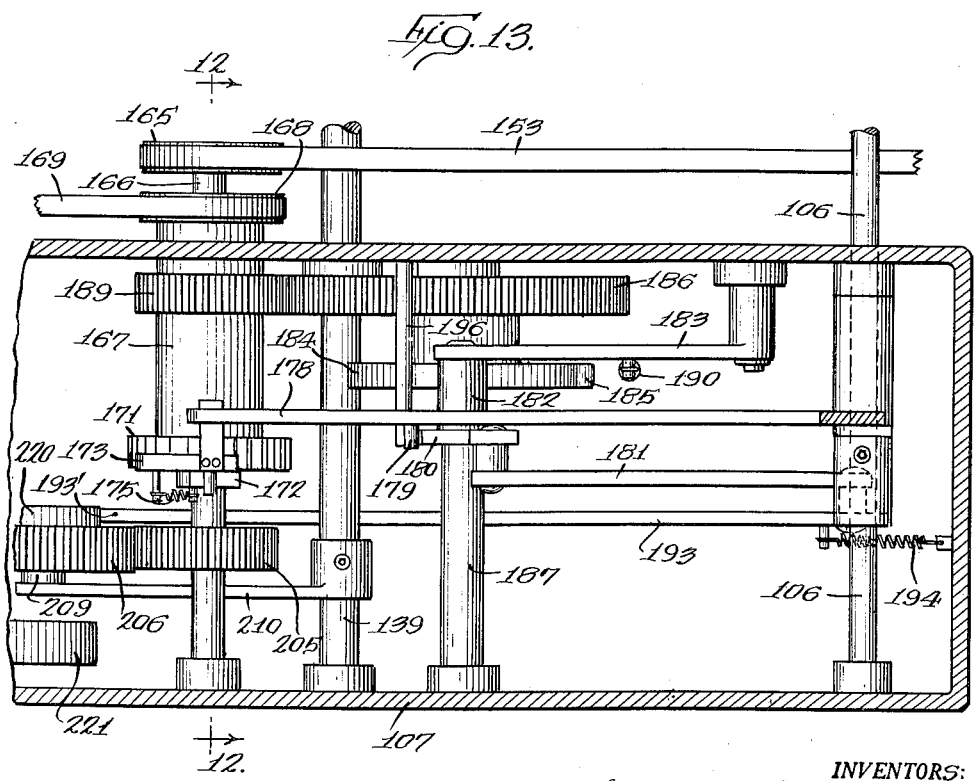

United States Patent Office 3,014,721
Patented Dec. 26, 1961

3,014,721
PIN DISTRIBUTING MECHANISM
Alexander J. Albrecht, West Englewood, N.J., and James B. Wyatt, Brooklyn, N.Y., assignors to The Brunswick Automatic Pinsetter Corporation, a corporation of Delaware
Filed Mar. 4, 1960, Ser. No. 12,839
17 Claims. (Cl. 273—43)

This invention relates to bowling pin handling mechanisms.

It is a general object of the invention to provide a new and improved pin distributing mechanism for use in connection with automatic pinsetter equipment.

Another object is to provide a new and improved pin distributing mechanism of the type described for receiving pins from a single source such as a cross conveyor and delivering the pins to a plurality of different positions such as pin stations triangularly arranged on a deck structure forming a part of, or intended for use in connection with, an automatic pinsetter.

A further object is to provide a new and improved pin distributing mechanism of the type described which comprises a compact arrangement minimizing the amount of space required and which utilizes moving masses of relatively light weight thereby enabling the use of light driving forces and higher speeds in the distribution of pins.

A more specific object is to provide a new and improved pin distributing mechanism in the form of a funnel or chute including a lower downwardly and laterally directed terminus which is rotatably indexable about an upright axis to distribute pins one at a time to a plurality of positions around the chute, the terminus being also pivotable about a horizontal axis for the purpose of dropping a pin to a position disposed directly beneath the chute.

Another object is to provide a new and improved pin distributing mechanism including a means for indexing a chute of the character mentioned, including a continuously driven input shaft, and a one revolution clutch mechanism driven cyclically by the input shaft and connected by gearing to index the chute.

An additional object is to provide a new and improved pin distributor including means for pivoting the lower terminus to drop a pin therebeneath, such pivoting means also being actuated by the one revolution clutch mechanism.

In a generic concept, the new and improved distributor of the present invention includes a guide means which directs pins from the indexable chute to a plurality of predetermined positions around the chute and holds the pins in inclined positions until pin delivery is completed, whereupon the guide means may be raised to tip the pins to upright positions.

Further objects and advantages will become readily apparent from the following detailed description taken in connection with the accompanying drawings, in which:

FIG. 1 is a top plan view of one embodiment of the invention;

FIG. 2 is a side elevational view of the pin distributing mechanism illustrated in FIG. 1;

FIG. 3 is a vertical sectional view taken at about line 3—3 of FIG. 1;

FIG. 4 is a fragmentary sectional view taken at about the line 4—4 of FIG. 3;

FIG. 5 is a fragmentary sectional view taken at about the line 5—5 of FIG. 3;

FIG. 6 is a fragmentary elevational view, partly in section, taken at about line 6—6 of FIG. 5;

FIG. 7 is a plan view of another embodiment of the invention with the top removed from a gear box;

FIG. 8 is a side elevational view of the distributor illustrated in FIG. 7;

FIG. 9 is a sectional view taken at about the line 9—9 of FIG. 7;

FIG. 10 is a sectional view taken at about line 10—10 of FIG. 7;

FIG. 11 is a fragmentary sectional view taken at about the line 11—11 of FIG. 9;

FIG. 12 is a fragmentary vertical sectional view in the gear box, taken at about the line 12—12 of FIG. 9; and FIG. 13 is a fragmentary horizontal section at about the line 13—13 of FIG. 9.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

Referring now to the drawings in more detail, and particularly the embodiment of FIGS. 1-6, it is contemplated that the pin distributing mechanism of this invention would be utilized in connection with an automatic pinsetter installation which would include means for gathering pins from the pit of the bowling alley and elevating such pins to a position at which they are discharged onto a cross conveyor as at 15 which in turn delivers the pins singly to a pin distributor generally designated 16. The distributor delivers the pins to a stationary deck structure 17 which in turn passes the pins to a movable deck structure therebeneath as illustrated in broken lines at 18. The movable deck structure 18 forms a part of the automatic pinsetter installation and moves from an elevated position to a lower position for dropping pins on the alley in the conventional triangular arrangement. The deck structure 18 is also operative for lifting standing pins after a ball has been rolled during a period when fallen pins are removed from the alley and then, for replacing such standing pins preparatory to the rolling of a second ball. The automatic pinsetter equipment referred to, including the movable deck structure 18 and suitable means for gathering pins from the pit and elevating the same to cross conveyor 15 is now well known in the art and as it forms no part of the present invention need not be described in further detail herein.

The cross conveyor 15 as illustrated includes a pulley shaft as at 20 supporting a pair of parallel spaced pulleys as at 21 which in turn support belts as at 22 which are spaced apart by a distance somewhat less than the diameter of a bowling pin at its belly so that the belts are adapted to support bowling pins in the positions illustrated in broken lines at P and pull the pins with the belts toward the right as illustrated in FIGS. 1, 2 and 3, with the heads of the pins hanging between the belts and dragging along suitable guide means as at 24. Near the right end, the guide means 24 includes an upwardly inclined portion as at 24a raising the heads of the pins as the bases of the pins pass over the end of the conveyor. Also, a guide portion is preferably provided at 24b for guiding the pins downwardly at the end of the conveyor.

The conveyor pulley shaft 20 may be suitably supported in and driven from a gear box illustrated diagrammatically at 25 including suitable means (not shown) for driving the shaft to advance the upper reach of the belts 22 toward the right. The gear box 25 may in turn be supported by a stationary frame structure (not shown) of the type including a cross rail having a midportion for supporting the gear box and opposite ends suitably affixed at opposite sides of the alley as illustrated, for example, in the copending application of William F. Huck and Alexander J. Albrecht, filed September 16, 1955, as Serial No. 534,726 now Patent No. 2,967,708. The guide member 24, 24a and 24b may be supported by a suitable bearing structure as at 26 supported on the shaft 20.

The gear box 25 also includes a pivotally mounted shaft as at 28 which carries a pin gate or switch member as at 29 positioned between the conveyor belts 20 near the end of the conveyor for controlling the passage of pins to the pin distributor 16. The gate member 29 is normally disposed in an upper position illustrated in full lines in FIG. 3 where it blocks the passage of a pin from the conveyor to the distributor, but is movable under control of means (not illustrated) in the gear box 25 to a depressed position illustrated in broken lines to permit the passage of a pin to the distributor 16. Movement of the member 29 may be controlled by a means such as that illustrated in connection with the embodiment of FIGS. 7–13, for example, to time and space the delivery of pins from the conveyor to the distributor one at a time.

The stationary deck structure 17 comprises a triangular plate 35 having nine triangularly arranged pin openings therethrough and a tenth opening centrally located within the triangle. These openings are of a size to permit passage of a pin therethrough, and are arranged in a pattern corresponding to the arrangement of pins when set properly on an alley for bowling, and accordingly have been numbered #1 to #10 as the pin positions on the alley are numbered. Adjacent each of the outer pin openings 36, that is, adjacent each of the openings except that corresponding to the #5 pin position, there is provided an upstanding guide or abutment member as at 37 positioned outwardly of the associated opening from the center of the plate. The members 37 act as abutments to limit outward movement of pins while in inclined positions as delivered by the distributor 16, and then as the pins are tipped to upright positions, the members 37 act to guide the bases of the pins into the adjacent openings 36 so that the pins may drop through the plate to the movable deck structure 18. The members 37 may be suitably secured to the deck plate 35 as by means of outwardly turned flange portions 38 bolted or screwed to the plate 35 as at 39.

Deck plate 35 is stationarily mounted as by means of hanger rods including one as at 40 rigidly suspended from the gear box 25 and fixedly attached at the lower end to the plate 35 as at 41. Additional hanger rods as at 42 are suspended from a cross rail 43 and have their lower ends fixedly secured to the plate 35 as at 44. The cross rail 43 forms a part of the stationary frame structure adjacent the alley pit and may have opposite ends (not shown) rigidly supported at opposite sides of the alley in a manner similar to the cross rail previously referred to.

In order to guide pins toward each of the outer pin openings 36, that is, toward each of the openings except that corresponding to the #5 position, and also for supporting the pins in inclined positions before they are dropped through the pin openings 36 a plurality of guides are provided as at 46. Each of the guides 46 comprises a pair of parallel guide rods 47, and the guides 46 emanate or radiate from positions centrally of the plate 35 which are equally spaced angularly about the center of the plate so as to receive pins from the distributor 16 when the distributor is indexed through equal angular steps. Outer ends of rods 47 are attached to plate 35 as at 47′. The rods 47 extend inwardly to positions adjacent the central pin opening 36 corresponding to the #5 pin, where the rods are turned downwardly as at 47a. The end portions 47a are suitably secured to a central annular support member 48 which is somewhat conically inclined and which has its lower portion flanged as at 49 and secured to the plate 35 as at 50. Preferably, the ends 47a are secured to the support 48 by an inner annular member 52 which is also somewhat conically inclined and which functions to clamp the rod ends 47a against the support 48 when the inner member 52 is clamped to the outer member 48 as by means of bolts 53. If desired, annular cushions may be positioned between the member 48 and the rods 47a as well as between the rods 47a and the inner member 52, as illustrated at 54. It will be understood that the inner member 52 and the rod ends 47a form a converging guideway for directing a pin through the central opening 36 at the #5 position.

The distributor 16 comprises a substantially tubular funnel or chute 59 which includes an upper portion 60 and a lower portion 61, the two providing a tube which is open at the upper end and which terminates at the lower end in a laterally and downwardly directed outlet so that the distributor is adapted to receive pins one at a time and to pass these pins lengthwise to positions outwardly of the distributor. At the upper end, the upper portion 60 is somewhat lower at the left side as viewed in FIGS. 2 and 3 in order to facilitate the entrance of pins from the conveyor 15 and is higher on the right side in order to direct the base of pins (delivered base first) downwardly through the chute. This is best understood on viewing FIG. 3 where it will be understood that pins delivered by the conveyor as illustrated at P, with the bases leading, are delivered into the chute as indicated by the pin at P1. The heavy base and the belly of the pin at P1 naturally falls into the chute and passes through the chute and down the guide rods 47 to the position P2 where the base of the pin overlies the pin opening 36 (at the #1 pin position as illustrated) with the base of the pin engaging the abutment or guide member 37. The lower end of the lower portion 61, including a tongue 61a, directs the pin onto the guide rods 47.

The lower portion 61 of the chute is provided at its upper end with an encircling worm gear 65 which is fixed to the lower portion of the chute and which is rotatably indexably supported on the lower end of the upper portion 60 as at 66 so that the lower portion 61 of the chute is indexable about an upright axis to deliver pins successively to a plurality of stations equally angularly spaced about the upright axis and corresponding respectively to the nine outer pin openings in the plate 35. The worm gear 65 is in mesh with a driving worm 67 on a shaft 68 rotatably mounted in the gear box 25. It will be understood that indexing movement of the lower portion 61 of the chute through nine equal angular increments or steps will provide for delivery of pins to each of the outer pin openings in the plate 35, that is, except to the central opening corresponding to the #5 pin position.

In order to provide for delivery of a pin to the central opening corresponding to the #5 pin position, the upper chute portion 60, and therefore the lower portion 61, is pivotally mounted for movement about a horizontal axis such as the axis of the worm 67. To this end, the upper portion 60 of the chute is provided at the left with a yoke-like part 70 having bearings as at 71 on the worm shaft 68 thereby pivotally mounting the upper portion 60. In order to pivot the chute, the yoke-like portion 70 is provided with an extension in the form of an arm 72 having a bifurcated lower end portion 73 with a pin 74 therethrough slidably and pivotally mounted in a slot 75 in a pivoted lever 76 fixed on a shaft 77 projecting from the gear box 25. It will be understood that on pivotal movement of the lever 76 in a counterclockwise direction as viewed in FIG. 3 to the position illustrated in broken lines, the arm 72 will be pivoted in a clockwise direction and will cause movement of the entire chute in a clockwise direction downwardly to a position illustrated in broken lines at 61′ where the tongue 61a substantially engages the inner ring 52 on the deck plate 35 so that a pin may be dropped through the central opening corresponding to the #5 pin position.

In operation, the chute portion 61 is indexed successively to the nine other pin positions where pins are delivered at each position and left lying inclined as illustrated at P2 with the bases abutting the stop or guide members 37 and with the pins partially supported by the guide rods 47. To assist in guiding the pins from the distributor chute to the guide rods 47 and also to assist in holding the pins in inclined positions as at P2, a central guide means surrounds the central opening corresponding to the #5 pin position, and this guide means takes the form of a somewhat annular guide member 80 normally positioned slightly above the level of the inner clamp member 52 (FIG. 3) and shaped as indicated by the shading at 81 to provide a plurality of equally angularly spaced pin stations in the form of shallow channels to which the pins are first delivered from the distributor and from which the pins pass to the guide rods 47. Because the #1, the #10 and the #7 pin positions are spaced considerably further from the pin distributor than the remaining outer pin positions (#3, #6, #9, #8, #4, and #2) the guide member 80 includes elongate tongues as at 82 which project a substantial distance toward the pin positions #1, #10 and #7, and the tongues serve to increase the reach of the guide member 80 toward the remote positions.

In order to tip the pins lying adjacent each of the outer openings from the inclined positions illustrated at P2 to upright positions so that pins may drop through the openings 36 in the plate 35, the guide member 80 is mounted movably to be raised from the position illustrated in full lines in FIG. 3 to the elevated position indicated in broken lines. This is attained by means of a pair of upright rods 84 having upper ends fixedly secured in depending projections 85 from the bearing bracket 26 and lower ends slidable in upright projections 86 on a plate 87 secured to the annular guide member 80 as by means of screws or bolts illustrated at 89.

The upright projections 86 are joined by a connecting pin 90 which is slidable and pivotable in a slot 91 formed in a projecting end of lever 76. It follows that when the lever 76 is pivoted in a counterclockwise direction as described previously, to pivot the chute for delivery of pins downwardly, the annular guide member 80 is simultaneously elevated to tip the pins adjacent the outer pin openings to upright positions at substantially the same time that a pin is dropped through the center opening.

In operation, gear box 25 provides for timed operation of the gate member 29 and indexing of the lower chute portion 61 so that a pin passing from the conveyor 15 drops through the chute 59 and immediately following, the lower portion of the chute is indexed to the next position. After the ninth pin has been dropped, the chute is indexed again to the #1 position, assuming it began by dropping the #1 pin first. At this time, the chute 59 is also pivoted to the broken line position illustrated at 61' in FIG. 3 to drop the tenth pin through the central opening. Simultaneously with the dropping of the tenth pin through the center opening, the annular guide 80 is elevated to tip the outer pins to upright positions as illustrated at P3 so that these also drop to the moving deck structure 18.

If desired, storage of pins in the stationary deck structure may be provided for by providing for a storage position of the pivotable chute 59. More particularly, if the chute 59 is pivoted in a clockwise direction from the full line position in FIG. 3 only partly to the broken line position 61' and is stopped after a short movement in the position illustrated in broken lines at 61", the center pin will not drop through the center opening but will be held as illustrated at P4 abutting a stop member as at 95 on the annular guide 80, while the annular guide will have been elevated slightly but not sufficiently to drop the pins through the outer openings.

It will be understood that the construction described provides for indexing movement of only a portion of a pin distributing chute, such as the lower portion 61 so that the moving masses are relatively light in weight and may therefore be actuated at greater speeds and by means of lighter driving forces. At the same time, the pin distributing structure illustrated is compact in that the pin distributor is located over the stationary deck structure by a distance substantially less than the length or height of a pin and the space required is thereby minimized.

Referring now to a preferred embodiment as illustrated in FIGS. 7 to 13, a cross conveyor 15a delivers pins one at a time to a distributor 16a which in turn delivers pins to a stationary deck structure 17a, and these units correspond to similar units in the previous embodiment which were designated by similar reference numbers without the suffix "a."

The conveyor 15a includes a pulley shaft 101 having a pair of pulleys 102 thereon with pin conveying belts 103 trained thereabout. The belts 103 grasp pins as illustrated in broken line at Pa and pull the pins, with the heads dragging, along a guide member as at 104 to deliver the pins to a position illustrated in broken line at P1a within the distributor 16a. Between the belts 103 adjacent the end of the conveyor, a pin gate or switch member 105 projects through the guide member 104 and normally is elevated to a position illustrated in full lines where it prevents passage of a pin from the conveyor to the distributor 16a. The member 105 is movable downwardly to a broken line position illustrated in FIG. 9 where it allows pins to pass to the distributor. The member 105 is an arm extension on a shaft 106 suitably mounted pivotally in a gear box illustrated diagrammatically at 107, and will be described in further detail hereinafter.

The stationary deck structure 17a in this embodiment comprises a single plate-like member 110 having suitable openings 111 stamped therethrough corresponding to the pin positions #1 to #10. The member 110 is also formed and shaped to locate the openings 111 at the bottom of pocket-like formations so that adjacent each of the outer openings, that is except the central opening corresponding to the #5 pin position, and outwardly of the opening from the central opening corresponding to the #5 pin, there are upright portions as at 112 which are engageable by the bases of the pins as they are delivered from the distributor 16a to the deck structure. Additionally, inwardly of the outer openings, that is between the outer openings and the central opening, the member 110 is formed and shaped to provide shallow pin guiding channels as illustrated at 113. As in the prior construction described, the channels 113 function to guide the pins toward the openings 111 and additionally aid in supporting the pins as the pins lie in inclined positions as illustrated at P2a awaiting the actuation of means which stands the pins vertically to upright positions as illustrated at P3a to drop through the openings 111 to a movable deck structure as illustrated at 18a, corresponding to that described in connection with the previous embodiment. Preferably, the upright portions 112 adjacent the outer edge of the outer openings 111 in the member 110 are provided with resilient buffer members which soften the impact of the pin base and reduce noise during pin distribution.

Adjacent the central pin opening 111 in the member 110, corresponding to the #5 pin position, the member 110 is formed and shaped as best illustrated in FIG. 9 to provide a generally conically converging guide portion 116 leading to the central opening to direct the pin from the pin distributor 16a toward the central opening to thereby facilitate its passage to the movable deck structure 18a.

The stationary deck structure 17a is preferably supported by means of a pair of hanger rods 117 having lower ends suitably affixed to the member 110 as best seen in FIG. 7 at 118. Upper ends of the rods 117 are secured to a transversely extending beam 119 having opposite ends (not shown) suitably supported stationarily at opposite sides of the alley.

In a fashion somewhat similar to that described in connection with the previous embodiment, an annular guide means surrounds the central opening 111 in the plate 110 to assist in guiding the pins toward the outer pin openings and to assist in holding the pins in inclined positions before they are tipped to upright positions. This guide means takes the form of a generally annular guide member 120 normally disposed at a level slightly above the uppermost portions of the stationary deck member 110 and formed with suitable depressions providing shallow guide channels as at 121 leading from equally angularly spaced positions around the distributor respectively to the guide channels 113 in the stationary deck member 110. To facilitate delivery of pins to the most remote pin openings corresponding to the #1, the #7 and the #10 pin positions and to stand pins at these positions, the guide member 120 is formed with elongate projecting tongue portions 122 which extend outwardly from the annular portion of the guide member toward the #1, #7 and #10 positions. For a purpose which will appear later, the guide member 120 is provided adjacent its inner periphery, at three positions, opposite the tongues 122, with rollers as at 124 extending downwardly from the guide member and rotatably supported thereon for abutment with the base of a pin intended for delivery through the central opening in the stationary deck corresponding to the #5 pin position.

The annular guide member 120 is supported for movement upwardly from the full line position illustrated in FIG. 9 to the full line position illustrated in FIG. 10 for the purpose of raising the heads of pins lying inclined to thereby stand the pins for passage through the pin openings. To this end, the guide member has secured thereto a plate member 130 having a pair of upright bearing members 131 slidably mounted on a pair of upright rods 132. The rods 132 are stationarily mounted as by attaching the lower ends to the stationary deck member 110 as at 133, and the upper ends of the rods are fixedly attached to a bearing structure 134 in which the pulley shaft 101 is supported. To raise the guide member 120, a pin 136 extends between the bearing projections 131 and a link 137 is pivotally mounted on the pin 136 and pivotally connected at its opposite end to a lever arm 138 secured on a pivot shaft 139 suitably mounted in the gear box 107. Operation of the shaft 139 and the arm 138 will be described in greater detail presently.

The distributor 16a in this embodiment is comprised of three parts, an upper portion 141, a midportion or central portion 142, and a lower portion 143. The upper portion 141 is securely attached to the bearing bracket 134 and is therefore stationary. The midportion 142 is propided at its upper ends with an encircling worm gear as at 144 securely fixed on the portion 142 and rotatably mounted in the lower end of the upper portion 141 as at 145 so that the midportion and the lower portion of the pin distributor chute are rotatably indexable on the upper portion. The lower portion 143 of the chute is provided with a pair of upwardly extending ears 147 which are pivotally mounted as at 148 on the midportion 142 so that the lower portion of the chute is pivotable about a horizontal axis from the full line position illustrated in FIG. 9 to the full line position illustrated in FIG. 10 to drop a pin through the central opening in the stationary deck 110.

The means for rotatably indexing the midportion 142 and the lower portion 143 of the pin distributing chute comprises a worm 150 rotatably supported on the bearing bracket 134 and engaging the worm gear 144 on the midportion 142. At one end, the worm shaft 151 is provided with a pulley 152 having a belt 153 trained thereabout and trained about a drive pulley in the gear box 107 as explained in more detail hereinafter.

The means for pivoting the lower portion 143 of the chute on the midportion 142 includes a downwardly extending bracket 155 affixed to the outside of the lower portion 143 and having one end of a link 156 pivotally mounted thereon as at 157. The opposite end of link 156 is provided with a pair of concavely grooved rollers 158 which embrace a ring 159 fixedly suspended as by means of rods 160 depending from the annular guide member 120. In this fashion, the midportion 142 and the lower portion 143 of the pin distributor chute may be rotatably indexed while the rollers 158 progress around the ring 159. At the same time, when the annular guide member 120 is elevated to tip the outermost pins to upright position, the ring 159 is raised and raises the link 156, pulling the bracket 155 to the left as viewed in FIG. 9 and ultimately upwardly to the position illustrated in FIG. 10 so that the lower portion 143 of the chute is positioned as illustrated in FIG. 10 to permit the passage of a pin directly downwardly beneath the chute.

Describing now the internal structure of the gear box 107, and first the means for indexing the midportion 142 and the lower portion 143 of the chute, the belt 153 which drives the indexing worm 150 is trained about a pulley 165 secured on a one revolution shaft 166 suitably mounted rotatably in the gear box and forming the output of the one revolution clutch mechanism for controlling indexing. A continuously rotating power input shaft in the form of a sleeve 167 rotatable on the shaft 166 provides the input to the one revolution clutch mechanism. The sleeve 167 has a pulley 168 fixed thereon, and a belt 169 trained about the pulley 168 may be driven by a suitable continuously operating power means such as a motor and suitable gearing (not shown).

The continuously rotating sleeve shaft 167 has a ratchet 171 fixed thereon and rotatable therewith. Adjacent the ratchet, and fixed on the shaft 166, a pawl carrier 172 has a pawl 173 pivotally mounted thereon as at 174. A tension spring 175 connected between the carrier and the pawl normally tends to maintain the pawl in engagement with the ratchet 171, but the pawl carries a lateral extension 177 engageable with a latch member 178 in the form of the lever pivotally mounted on the shaft 106. The latch lever 178 has a pin 179 thereon engageable by the upper end of a latch release member 180. The latch release member 180 is carried by a link 181 and at its lower end carries one shaft extension of a cam roller 182, the opposite shaft extension of which is carried by a lever 183 suitably pivoted in the gear box. The cam roller 182 engages a cam 184 having a lobe 185 for elevating the roller, the lever 183, the link 181, and the latch release member 180.

The cam 184 rotates with gear 186 fixed on a shaft 187 rotatably mounted in the gear housing. The gear 186 meshes with a gear 189 on the continuously rotating sleeve shaft 167. A spring 190 biases the lever 183 downwardly to maintain the roller 182 in contact with the cam 184. A spring 191 biases the latch lever 178 downwardly. The link 181, which has one end pivotally connected to the latch release member 180, has its opposite end pivotally connected to an arm 193 pivotable on the shaft 106 with the pin gate member 105. A spring 194 biases the arm 193 and the pin gate member in a counterclockwise direction. The upper extension of the latch release member 180 has a side surface engageable with a pin 196 fixedly mounted in the gear box. These parts constitute the one revolution clutch mechanism.

In operation, as pins are delivered along the conveyor 15a toward the discharge end of the conveyor, they engage the pin gate member 105 but the member is normally held in the upper position illustrated in full line in FIG. 9 by virtue of the engagement of the side surface of latch release member 180 with the pin 196, this engagement preventing pivotal movement of the pin gate member and the lever arm 193 by virtue of the connection of the latch release member 180 to the arm 193 by means of the link 181. Thus the pins are held from discharge until such time as the pin gate member is released for pivotal movement in a clockwise direction by elevation of the latch release member 180.

While the pin awaits discharge, the sleeve shaft 167, the ratchet 171 thereon and the cam 184 driven thereby all rotate continuously, and the latch member 178 normally engages the pawl extension 177 to maintain the pawl 173 disengaged from the ratchet so that there is no indexing drive to the midportion 142 and the lower portion 143 of the indexable chute. The sizes of gears 189 and 186 are such that the cam shaft 187 rotates once for every three revolutions of the continuously rotating input sleeve shaft 167. As the cam 184 rotates in a clockwise direction as viewed in FIG. 9, the lobe 185 thereon eventually engages the cam roller 182 to elevate the latch release member 180.

If, at the time the latch release member is elevated, a pin is in contact with the pin gate member 105, the pin gate member is released for clockwise pivotal movement by the pin against the urge of spring 194 by virtue of the elevation of latch release member 180 and such movement causes the connecting link 181 to move the upper end of the latch release member toward the left as viewed in FIG. 9 so that the upper end of the latch release member engages the pin 179 on the latch 178 to thereby raise the latch and release the pawl 173 for engagement with the ratchet 171. Thus, the pin gate member 105 is lowered to allow passage of a pin which immediately drops through the indexable chute to the pin position to which the chute is indexed. Immediately following, by virtue of engagement of the pawl 173 with the ratchet 171, the one revolution shaft 166 is driven so that rotation of the pulley 165 thereon drives the indexing belt 153, the pulley 152 on the worm shaft, and also the worm 150 to index the midportion 142 and the lower portion 143 of the chute to the next pin discharge position.

Immediately following the passage of the lobe 185 on cam 184 beyond the cam roller 182, the latch release member is lowered by virtue of the bias of spring 190 so that the latch member 178 may also move downwardly under the bias of the spring 191. Accordingly, after one revolution of the one revolution shaft 166 the lateral projection 177 on the pawl is engaged again by the latch member 178 to disengage the pawl from the ratchet 171 and thereby discontinue rotation of the one revolution shaft. This terminates indexing until the conditions described reoccur to cause a succeeding indexing. Latch member 178 holds a pin 173' on pawl 173 against the upper inclined surface of pawl carrier 172.

It will be understood that cam lobe 185 must be of a sufficient length at the high part thereof to maintain the linkage 180, 181, 183 elevated for a time interval sufficient for one pin to pass over the pin gate 105. After passage of the pin over the gate, cam lobe 185 permits a rapid fall of the linkage in order to block the next pin arriving at the gate 105 so that the pins pass only one at a time. The surface of the link 180 engaging the pin 196 is formed to permit rapid movement of the link 180 between the gate blocking position and the non-blocking position.

In operation, the sequence described above is repeated nine times, and assuming it all began with the chute indexed to the #1 position and by dropping a pin at the #1 position and indexing to the #3 position, after nine pin drops each followed by an index, the chute is again positioned at the #1 position. Following this, the operation of the gear box causes the lower portion 143 of the chute to pivot for dropping a pin through the central opening to the #5 position while the chute continues to index three additional steps to conclude the entire cycle at the #10 position.

The operation last described in the paragraph immediately preceding occurs by virtue of the provision of a pinion 205 on the one revolution shaft 166 engaging a larger gear 206 on a shaft 207 in gear box 167. The gears 205 and 206 are sized such that twelve revolutions of the one revolution shaft and the pinion 205 are required to produce one revolution of the gear 206. The gear 206 is provided with a cam track 208 which receives a cam follower roller 209 on the end of an arm 210 which is pivotable on shaft 139 with the arm 138 which elevates the annular guide member 130 and pivots the lower chute portion 143. The cam track 208 is substantially circular for about 9/12 of its track and rotates in a clockwise direction as viewed in FIG. 9. The tenth 1/12 of the cam track includes a small rise 211, and the last 2/12 of the track include a pronounced rise 212. Thus, after the cam rotates 9/12 of a revolution, during which nine pins are dropped in the nine outer positions on the stationary deck, the next 1/12 rotation causes a slight pivotal movement of the lever 210, 138 in a counterclockwise direction to raise the annular guide 130 slightly and to cause pivotal movement of the lower portion 143 of the chute by only a slight amount so that the pin dropping at this time with the chute at the #1 position engages the roller 124 at the #1 position. This prevents the pin from passing to the #1 position and also temporarily prevents its passage to the central opening corresponding to the #5 position.

During the tenth 1/12 revolution of the gear 206, a blocking cam 220 on the reverse side thereof comes into engagement with an end portion 193' of the lever 193 so that pivotal movement of this lever with the pin gate member 105 in a clockwise direction is prevented to preclude further passage of pins during delivery of the pin to the central opening and while indexing occurs through three additional final steps to leave the chute at the #10 position. Also, during the tenth 1/12 revolution of the gear 206 a cam 221 on the shaft 207 brings its lobe 222 into engagement with a follower roller 223 on a short lever 224 pivotally connected to a link 225. The link 225 thereby sends a signal mechanically to a mechanism (not shown) to initiate a determination of whether the movable deck structure 18a is ready to receive an entire complement of pins from the stationary deck structure 17a. Upon a determination that the movable deck structure 18a is prepared to receive the entire complement of pins from the stationary deck structure 17a, a signal is returned mechanically through a link 226 having a pin and slot connection as at 229 to a projection on the latch lever 178. This signal is in the form of a movement of the link 226 toward the right as viewed in FIG. 9 to lift the latch 178 thereby allowing engagement of the pawl 173 with the ratchet 171 for continued rotation of the one revolution shaft through two complete revolutions to permit continued lifting of the annular guide 130 and continued pivoting of the lower chute portion 143 to drop the entire complement of pins. Pin and slot connection 229 enables movement of latch member 178 without moving link 226.

When the signal is received by latch 178, and the pawl engaged with the ratchet, the gear 206 continues through the final 2/12 of its rotation, during which time the pronounced rise 212 in the cam track 208 causes continued pivotal movement of the lever 210, 138 in a counterclockwise direction to lift the annular guide to the position illustrated in FIG. 10, and to pivot the lower chute portion 143 to the position illustrated in FIG. 10. This drops the entire complement of ten pins to the movable deck structure 18a, after which the parts are returned to normal positions.

The mode of operation described above requires that there be three differing cycles of operation for delivering ten pins to the stationary deck structure for delivery in turn to the movable deck structure. The first cycle of operation will be as described above wherein the first pin is dropped into #1 position and the remaining pins are dropped in the following order: #3, #6, #10, #9, #8, #7, #4, #2, #5. As described above, this leaves the indexable chute at the #10 position where the next cycle of operation begins. In this cycle, the pins are dropped in the following order: #10, #9, #8, #7, #4, #2, #1, #3, #6, #5. This cycle of operation will leave the indexable chute at the #7 position so that the following cycle would drop pins in the following order: #7, #4, #2, #1, #3, #6, #10, #9, #8, #5. After this, the original cycle will be repeated.

An important advantage of the construction described resides in the provision of a single drive both for indexing the chute and for pivoting the chute to drop the last pin while at the same time allowing continued indexing through three steps while the ten pins are dropped (by raising the annular guide 130 and pivoting the chute portion 143) without the need for a clutch which disables the indexing drive while elevating the annular guide 130 and pivoting the chute portion 143.

Another important advantage of this construction resides in a reduction of mass of the pivotable chute portion to that illustrated at 143 so as to increase the speed with which the pivoting may be accomplished and to reduce the power required for pivoting. This embodiment, like the one previously described, also provides for a lightweight and compact pin distributing mechanism.

We claim:

1. A pin distributing mechanism, comprising, a generally horizontally disposed conveyor for conveying pins one at a time to a pin discharge station, a pin distributor at said discharge station approximately at the level of said conveyor and of a height approximately equal the length of a pin for receiving pins one at a time from the conveyor, said distributor having a downwardly and laterally directed chute for passing pins lengthwise one at a time, means mounting the distributor for indexing about an upright axis to deliver pins respectively to a plurality of positions spaced around said axis, a pin receiving deck disposed beneath the distributor by a distance approximately equal the diameter of a pin and having a plurality of pin receiving stations respectively at said positions for receiving pins from the distributor, and means for releasably holding pins in generally horizontal positions at the pin receiving stations.

2. A pin distributing mechanism, comprising, a deck having a plurality of pin receiving stations arranged in a continuous series, a plurality of abutments on the deck one adjacent each pin receiving station positioned outwardly of the station from the center of the series, a pin distributor positioned over said deck plate and having a laterally and downwardly directed chute for passing pins one at a time base first, means mounting the distributor for indexing movement about an upright axis approximately at the center of the series of pin receiving stations for delivering pins successively to the receiving stations, guide means disposed around the axis of the distributor for holding the pins in inclined positions at the receiving stations with the bases engaging said abutments, and means for raising the guide means to tip the pins to upright positions at the receiving stations.

3. A bowling pin distributing mechanism, comprising, a pin distributor having a laterally and downwardly directed chute terminating in a laterally and downwardly opening outlet for passing bowling pins one at a time, means mounting the chute for indexing movement about an upright axis to deliver pins to a plurality of positions spaced around said axis, means mounting at least a portion of said chute for pivotal movement about a generally horizontal axis to direct the outlet downwardly to pass a bowling pin to a position beneath the distributor, means for indexing the chute, and means for pivoting said portion of the chute.

4. A pin distributing mechanism, comprising, a deck having a plurality of outer pin openings therethrough arranged in a continuous series and an additional opening approximately at the center of the series, a plurality of abutments on the deck one adjacent each outer opening positioned outwardly of the associated opening from the central opening, a pin distributor positioned above the central opening and having a laterally and downwardly directed chute for passing pins one at a time, means mounting the chute for indexing movement about an upright axis for delivering pins respectively to the outer openings, guide means disposed around the axis of the distributor for holding the pins in inclined positions with the bases over the openings and engaging said abutments, means for raising the guide means to tip the pins to upright positions to pass through the openings, and means mounting at least a portion of said chute for pivotal movement about a generally horizontal axis to direct a pin to the central opening.

5. A pin distributing mechanism as defined in claim 4, wherein said guide means comprises a generally annular guide member around the central opening having individual guide portions thereon respectively for guiding pins from said chute at different angularly indexed positions thereof toward said outer openings, and including a pair of upright guide rods on which the guide member is slidably mounted, and wherein the means for raising the guide means comprises a lever having one end pivotally mounted and the other end pivotally interconnected with said guide member.

6. A pin distributing mechanism, comprising, a frame, a tubular pin distributing chute including an upright upper portion pivotable on the frame about a generally horizontal axis and a lower portion rotatable on the upper portion about the axis of the upper portion and having a lower downwardly and laterally directed terminus, means for rotatably indexing the lower portion of the chute on the upper portion to deliver pins one at a time to a plurality of positions angularly spaced around the chute and means for pivoting the entire chute about said generally horizontal axis to direct the terminus downwardly to deliver a pin to a position beneath the chute.

7. A pin distributing mechanism, comprising, a stationary deck having a plurality of outer pin openings therethrough arranged in a triangular pattern and an additional opening therethrough substantially at the center of the triangular pattern, a plurality of abutments on the deck one adjacent each of the outer openings positioned outwardly of the associated opening from the central opening, a frame, a tubular distributing chute positioned over the central opening including an upright upper portion pivotable on the frame about a horizontal axis and a lower portion rotatably indexable on the upper portion about an upright axis and having a lower downwardly and laterally directed terminus, means for indexing the lower portion of the chute on the upper portion to deliver pins one at a time to a plurality of stations angularly spaced about the chute, guide means around the central opening at said stations for directing pins toward the outer openings and holding the pins in inclined positions with the bases of the pins over the outer openings and engaging the abutments, means mounting the guide means for movement upwardly to tip the pins to upright positions to pass through the outer openings, means for raising the guide means, and means for pivoting the entire chute about said horizontal axis to drop a pin through the central opening in the deck.

8. A pin distributing mechanism, comprising, a pin distributing chute including a stationary upright upper portion, a mid-portion rotatably indexable on the lower end of the upper portion about an upright axis and a lower portion pivotable on the mid-portion about a generally horizontal axis and having a lower downwardly and laterally directed terminus, means for indexing the mid-portion and the lower portion of the chute on the upper portion to deliver pins one at a time to a plurality of positions angularly spaced around the chute, and means for pivoting the lower portion of the chute on the mid-portion of the chute to direct the terminus downwardly to deliver a pin to a position beneath the chute.

9. A pin distributing mechanism comprising, a sta*i*n- ary deck having a plurality of outer pin openings therethrough arranged in a triangular pattern and an additional opening therethrough substantially at the center of the triangular pattern, a plurality of abutments on the deck one adjacent each of the outer openings positioned outwardly of the associated opening from the central opening, a tubular pin distributing chute positioned over the central opening including a stationary upright upper portion, a mid-portion rotatably indexable on the upper portion about an upright axis and a lower portion pivotable on the mid-portion about a horizontal axis and having a lower downwardly and laterally directed terminus, means for indexing the mid-portion and the lower portion of the chute on the upper portion to deliver pins one at a time to a plurality of stations angularly spaced about the chute, guide means around the central opening at said stations for directing pins toward the outer openings and for holding the pins in inclined positions with the bases of the pins over the outer openings and engaging the abutments, means mounting the guide means for movement upwardly to tip the pins to upright positions to pass through the outer openings, and means for raising the guide means and simultaneously pivoting the lower portion of the chute to drop pins through all openings.

10. A pin distributing mechanism, comprising, a deck having a plurality of outer pin openings therethrough arranged in a continuous series and an additional opening therethrough approximately at the center of the series, a plurality of abutments on the deck one adjacent each outer opening in the series positioned outwardly of the associated opening from the central opening, a support, a tubular pin distributing chute positioned over the central opening including an upper portion rotatably indexable on the support about an upright axis and a lower portion pivotable on the upper portion about a horizontal axis and having a lower downwardly and laterally directed terminus, means for indexing the upper portion and the lower portion of the chute on the support to deliver pins one at a time to a plurality of stations angularly spaced around the chute, an annular guide member around the central opening having individual guide portions thereon for directing pins respectively from said stations to said outer openings and for holding the pins in inclined positions with the bases of the pins over the outer openings and engaging the abutments, a pair of upright rods on which the guide member is slidably mounted for movement upwardly to tip the pins to upright positions to pass through the outer openings, a pivoted lever having one end pivotally interconnected with the guide member for raising the guide member, a lever having one end pivotally attached to the lower portion of said chute, and a ring on said guide member having the opposite end of said last recited lever slidable thereon to permit indexing of said chute and pivotable thereon to pivot the lower portion of the chute when a guide member is raised.

11. A pin distributing mechanism, comprising, a conveyor for conveying pins toward a pin discharge station, a pin gate at the discharge station for passing pins one at a time, a pin distributor at said discharge station for receiving pins one at a tme from the conveyor, said distributor having a laterally and downwardly directed chute for passing pins one at a time, means mounting the chute for indexing movement about an upright axis to deliver pins to a plurality of pin positions spaced around said axis, a continuously rotating power input shaft, a one revolution clutch mechanism cyclically driven by said input shaft, including a one revolution shaft connected by gearing to index said chute, a ratchet on said continuously rotating shaft, a pawl on said one revolution shaft, a latch for holding the pawl disengaged from the ratchet, a latch release member for disengaging the latch from the pawl, said release member normally preventing operation of said pin gate, means driven by said continuously rotating shaft for cyclically actuating said release member to release said pin gate for operation by a pin on the conveyor engaged therewith, and means controlled by the pin gate for conditioning the release member when the latter is cyclically operated and when the pin gate is engaged by a pin to thereby release said latch from said pawl, so that a pin is delivered through said distributor and the distributor is then indexed.

12. A bowling pin distributing mechanism, comprising, a pin distributor having a laterally and downwardly directed chute for passing bowling pins one at a time, means mounting the chute for indexing movement about an upright axis to deliver pins to a plurality of positions spaced around said axis, means mounting at least a portion of said chute for pivotal movement about a generally horizontal axis to pass a bowling pin to a position beneath the distributor, means for indexing the chute including a continuously rotating power input shaft, a one revolution clutch mechanism cyclically energized by said input shaft, and gearing connecting the one revolution clutch mechanism and the chute to index the latter one step upon each energization of the clutch mechanism, and means for pivoting said portion of said chute including a lever connected to pivot the chute, and a cam engaging the lever and driven by said one revolution clutch mechanism to pivot the lever after a predetermined number of indexing steps.

13. A pin distributing mechanism, comprising, a conveyor for conveying pins toward a pin discharge station, a pin gate at the discharge station for passing pins one at a time, a pin distributing chute at said discharge station for receiving pins one at a time from the conveyor, said chute including an upper portion and a lower portion having a laterally and downwardly directed terminus, means mounting the upper portion of the chute for indexing movement about an upright axis to deliver pins to a plurality of positions spaced around said axis, means mounting the lower portion of the chute on the upper portion thereof for pivotal movement about a horizontal axis to drop a pin to a position beneath the chute, a continuously rotating power input shaft, a one revolution clutch mechanism controlled by said pin gate and cyclically driven by said input shaft including means for releasing said pin gate for operation by a pin engaged therewith and a one revolution shaft connected by gearing to the upper portion of the chute to index the chute whereby a pin is delivered through said chute and the chute is then indexed, a lever connected to pivot the lower portion of the chute, a cam engaging the lever and driven by said one revolution shaft to pivot the lever after a predetermined number of indexing steps, and a blocking cam driven by said one revolution shaft for blocking operation of said pin gate to prevent pin delivery for a predetermined period during pivoting of the lower chute portion following said predetermined number of indexing steps.

14. A pin distributing mechanism, comprising, a conveyor for conveying pins one at a time to a pin discharge station, a pin distributor at said discharge station approximately at the level thereof for receiving pins one at a time from the conveyor, said distributor having a downwardly and laterally directed chute for passing pins lengthwise one at a time, means mounting the distributor for indexing about an upright axis to deliver pins respectively to a plurality of positions spaced around said axis, a pin receiving deck disposed beneath the distributor by a distance substantially less than the height of a pin and having a plurality of pin receiving stations respectively at said positions for receiving pins from the distributor, and means for releasably holding pins in inclined positions at the pin receiving stations.

15. A pin distributing mechanism, comprising, a conveyor for conveying pins toward a pin discharge station, a pin gate at the discharge station movable between a pin blocking position and a pin passing position, means normally operable to retain the pin gate in the pin blocking position, a pin distributor at said discharge station for receiving pins one at a time from the conveyor, said distributor including a laterally and downwardly directed chute for passing pins one at a time, means mounting the chute for indexing movement about an upright axis to deliver pins to a plurality of pin positions spaced around said axis, a continuously rotating power input shaft, a one revolution clutch mechanism including an output shaft connected to index said chute, means driven by said input shaft for cyclically operating said gate retaining means to release the gate for movement by a pin to pin passing position, and means controlled by cyclic operation of said gate retaining means and simultaneous operation of said gate for connecting said clutch mechanism to the input shaft to index the chute.

16. A pin distributing mechanism comprising, a stationary deck having a plurality of outer pin openings therethrough arranged in a triangular pattern and an additional opening therethrough substantially at the center of the triangular pattern, a plurality of abutments on the deck one adjacent each of the outer openings positioned outwardly at the associated opening from the central opening, a tubular pin distributing chute positioned over the central opening including a stationary upright upper portion, a mid-portion rotatably indexable on the upper portion about an upright axis and a lower portion pivotable on the midportion about a horizontal axis and having a lower downwardly and laterally directed terminus, means for indexing the midportion and the lower portion of the chute on the upper portion to deliver pins one at a time to a plurality of stations angularly spaced about the chute, guide means around the central opening at said stations for directing pins toward the outer openings and for holding the pins in inclined positions with the bases of the pins over the outer openings and engaging the abutments, means mounting the guide means for movement upwardly to tip the pins to upright positions to pass through the outer openings, abutment means engageable by a pin in the chute when the lower portion of the chute is pivoted slightly for storing a pin in the chute, and means for slightly pivoting the lower portion of the chute to store an entire complement of pins and then raising the guide means and completely pivoting the lower portion of the chute to drop pins through all openings.

17. A pin distributing mechanism, comprising, a conveyor for conveying pins toward a pin discharge station, a pin operable gate at the discharge station movable between a pin blocking position and a pin passing position, a pin distributor at the discharge station for receiving pins one at a time from the conveyor including a chute for passing the pins, means mouning the chute for indexing movement to distribute the pins, a continuously rotatable power input shaft, a one revolution clutch mechanism operable by said input shaft including an output shaft connected to index said chute, a cyclically operable means driven by said input shaft, and means controlled by operation of said cyclic means and simultaneous pin operation of said gate for controlling movement of the pin gate to pin passing position and energization of the one revolution clutch to index the chute.

References Cited in the file of this patent

UNITED STATES PATENTS

| | | |
|---|---|---|
| 1,692,796 | Bishop | Nov. 20, 1928 |
| 1,718,460 | Hansen et al. | June 25, 1929 |
| 2,253,604 | Blain | Aug. 26, 1941 |
| 2,697,604 | Blair | Dec. 21, 1954 |
| 2,781,195 | Holloway et al. | Feb. 12, 1957 |